United States Patent [19]
Kawasaki et al.

[11] Patent Number: 5,629,250
[45] Date of Patent: May 13, 1997

[54] SILICON NITRIDE JIG FOR HOT ROLLING

[75] Inventors: Keiji Kawasaki, Chiryu; Shinichi Miwa, Tajimi, both of Japan

[73] Assignee: NGK Insulators, Ltd., Nagoya, Japan

[21] Appl. No.: 594,702

[22] Filed: Jan. 31, 1996

[30] Foreign Application Priority Data

Feb. 9, 1995 [JP] Japan .................................. 7-022030

[51] Int. Cl.$^6$ .................................................. C04B 35/587
[52] U.S. Cl. .................................................. 501/97; 501/98
[58] Field of Search .................................. 501/97, 98

[56] References Cited

U.S. PATENT DOCUMENTS

| | | | |
|---|---|---|---|
| 4,920,085 | 4/1990 | Yoshida et al. | 501/97 |
| 4,940,680 | 7/1990 | Takahashi et al. | 501/97 |
| 4,977,112 | 12/1990 | Matsui | 501/97 |
| 5,002,907 | 3/1991 | Hayakawa et al. | 501/97 |
| 5,089,449 | 2/1992 | Miwa et al. | 501/97 |
| 5,096,859 | 3/1992 | Sakai et al. | 501/97 |
| 5,229,046 | 7/1993 | Watanabe et al. | 501/97 |

*Primary Examiner*—Karl Group
*Attorney, Agent, or Firm*—Kubovcik & Kubovcik

[57] ABSTRACT

A ceramic jig for hot rolling is a sintered body consisting essentially of $Si_3N_4$, a sintering aid and trace amounts of impurities. In the ceramic jig, crystallization is made among the $Si_3N_4$ grains, and a crystalline phase among the grains comprises 80% or more of a J phase, 10% or less of an H phase and 5% or less of a K phase. A reaction of a jig component with iron and water can be inhibited, and the wear of the jig at the time of rolling can be reduced. The seizure of the jig on a steel material does not occur, so that scratches on products can be remarkably reduced.

6 Claims, No Drawings

SILICON NITRIDE JIG FOR HOT ROLLING

BACKGROUND OF THE INVENTION

(i) Field of the Invention

The present invention relates to a ceramic jig such as a guide roller, a rolling roll or a guide tube which can be suitably used as a jig for the hot rolling of steel or alloys.

(ii) Description of the Related Art

Heretofore, jigs such as a guide roller and a rolling roll which can be used in a hot rolling line for manufacturing bars, wires, tubes or the like have been mainly made of metals.

However, these metallic hot rolling jigs are usually easily worn, and so these jigs have a short life. The jigs made of WC super hard alloys and the like which are excellent in wear resistance have been developed, but even such jigs are poor in heat resistance. Therefore, there is a problem that when the jig comes in contact with a material to be rolled, chap and baking tend to occur. In addition, these metallic jigs are heavy, which makes the attachment or the exchange operation of such jigs difficult.

In recent years, as jigs which can be substituted for such metallic jigs for hot rolling, there have been intensively investigated ceramic jigs for hot rolling which can utilize excellent characteristics of ceramics such as wear resistance, heat resistance and light weight. As a constitutional material of such a ceramic jig for hot rolling, a sintered silicon nitride which is known a high strength ceramics is mainly used, but silicon nitride is a substance which can scarcely be sintered. Thus, in the manufacture of the jig from the silicon nitride material, an oxide such as $Y_2O_3$, $Al_2O_3$ or MgO is usually added as a sintering aid in order to accelerate the sintering via a glass phase formed among silicon nitride particles.

However, when the jig for hot rolling comprising a conventional silicon nitride sintered body which has been manufactured as described above is used in a hot rolling line of steel or alloys, the remaining glass phase among the $Si_3N_4$ grains reacts with iron in the material to be rolled and cooling water, so that the jig is corroded and thus it is noticeably worn during its use inconveniently.

SUMMARY OF THE INVENTION

In view of such a problem, the present invention has been intended, and an object of the present invention is to provide a ceramic jig for hot rolling made of silicon nitride in which such corrosion among silicon nitride particles as described above is inhibited and wear resistance is remarkably improved.

In order to achieve the above-mentioned object, according to the present invention, there is provided a ceramic jig for hot rolling which comprises a sintered body consisting essentially of $Si_3N_4$, a sintering aid and trace amounts of impurities in which crystallization is made among the $Si_3N_4$ grains. The crystalline grain boundary phase among the grains comprises 80% or more of a J phase, 10% or less of an H phase and 5% or less of a K phase, preferably 90% or more of the J phase, 5% or less of the H phase and 1% or less of the K phase. The crystallized grain boundary phase may also comprise 0.1 to 10% of an H phase and 0.1 to 5% of a K phase. The strength of the jig does not deteriorate even at a high temperature of 1,200° C. or more.

In the present invention, the J phase is the crystalline phase of a caspidine structure, the H phase is the crystalline phase of an apatite structure, and the K phase is the crystalline phase of a silicate limestone. These crystalline phases can be determined on the basis of the results of X-ray diffraction using CuK alpha rays.

Furthermore, according to the present invention, there is provided a method for manufacturing a ceramic jig for hot rolling which comprises the steps of molding, into a desired shape, a material powder obtained by adding a sintering aid to an $Si_3N_4$ powder, sintering the molded material, and then subjecting it to a heat treatment in a temperature range of 1,100 to 1,300° C. in a nitrogen atmosphere to carry out crystallization among the $Si_3N_4$ grains.

DETAILED DESCRIPTION OF THE INVENTION

The present invention has been attained on the basis of knowledge that a glass phase among the $Si_3N_4$ grains of a sintered body can be crystallized by further subjecting a silicon nitride sintered body obtained in a usual sintering method to a heat treatment under predetermined conditions.

The ceramic jig for hot rolling of the present invention can be obtained by molding, into a desired shape, a material powder obtained by adding a specific sintering aid to a silicon nitride powder and then mixing them, heating/sintering the molded material, and after the sintering has been completed to some extent, further subjecting it to a heat treatment under predetermined conditions to carry out crystallization among the silicon nitride grains.

In the thus obtained ceramic jig for hot rolling of the present invention, the crystallization is made among the silicon nitride grains, and for this reason, the deterioration of its strength at a high temperature is smaller than in a usual sintered silicon nitride, and the reaction of a jig component with iron contained in the material to be rolled and water is inhibited. As a consequence, the abrasion wear of the jig at the time of the rolling is much smaller as compared with a conventional article in which a large amount of the glass phase is present among the silicon nitride grains.

In the ceramic jig for hot rolling of the present invention, the crystalline grain boundary phase formed among the silicon nitride grains typically comprises 80% or more of the J phase, 10% or less of the H phase and 5% or less of the K phase, preferably 90% or more of the J phase, 5% or less of the H phase and 1% or less of the K phase. If the J phase is less than 80%, reactivity to iron and water between the sintered particles is high, and even if the H phase is more than 10% or if the K phase is more than 5%, similar results come out. This fact is supposed to be due to a difference between the reactivities of the respective crystalline phases to iron and water.

Preferred examples of the composition of the sintered body constituting the ceramic jig for hot rolling of the present invention are as follows(a)

(a) 1 to 10 wt % of $Y_2O_3$, 3 to 20 wt % of $Yb_2O_3$, balance of $Si_3N_4$ and inevitable impurities.

(b) 1 to 10 wt % of $Y_2O_3$, 1 to 10 wt % of MgO, 0.01 to 5 wt % of $ZrO_2$, balance of $Si_3N_4$ and inevitable impurities.

(c) 1 to 10 wt % of $Y_2O_3$, 0.01 to 20 wt % of $Al_2O_3$, balance of $Si_3N_4$ and inevitable impurities.

A ratio among the J phase, the H phase and the K phase of the crystalline phases in the sintered body can substantially be controlled by the kind and the amount of sintering aid at the time manufacture and by the heat treatment temperature in crystallizing the glass phase among the silicon nitride grains.

In this case, as is apparent from the above-mentioned composition examples of the sintered body, preferred examples of the sintering aid are as follows.

(a) 1 to 10 wt % of $Y_2O_3$ and 3 to 20 wt % of $Yb_2O_3$.

(b) 1 to 10 wt % of $Y_2O_3$, 1 to 10 wt % of MgO and 0.01 to 5 wt % of $ZrO_2$.

(c) 1 to 10 wt % of $Y_2O_3$ and 0.01 to 20 wt % of $Al_2O_3$.

The heat treatment temperature is in the range of 1,100° to 1,300° C., preferably 1,200° to 1,300° C. The heat treatment atmosphere is required to be a nitrogen atmosphere or an inert atmosphere. The heat treatment for the crystallization may be disposed as a quite different step after a usual sintering step, or it may be contained in the sintering step. In other words, after the completion of the sintering, the sintered material may be heated from a sintering temperature to the heat treatment temperature, and the heat treatment may be carried out at this temperature for a predetermined period of time, and the heated material may be cooled to room temperature.

The above-mentioned kind and amount of sintering aid and the above-mentioned heat treatment conditions of the heat treatment temperature and the like permit obtaining the silicon nitride sintered body having the above-mentioned ratio of the crystalline phases.

As described above, a ceramic jig for hot rolling made of silicon nitride according to the present invention is subjected to a usual sintering step and then additionally a predetermined heat treatment to perform crystallization among silicon nitride particles, so that a reaction of a jig component with iron and water is inhibited and the wear of the jig at the time of rolling can be reduced. In addition, since the jig is not backed on a steel material, scratches on products can be remarkably reduced. It has been confirmed that this scratch prevention effect remarkably increases on a material to be rolled having a high melting point such as a stainless steel.

Now, the present invention will be described in more detail with reference to examples, but the scope of the present invention should not be limited to these examples.

EXAMPLE 1, COMPARATIVE EXAMPLE 1

87 wt % of a silicon nitride material was mixed with a sintering aid comprising 6 wt % of a Y component in terms of $Y_2O_3$, 4 wt % of an Mg component in terms of MgO and 3 wt % of a Zr component in terms of $ZrO_2$, and the blend was then sufficiently mixed in a ball mill using beads made of zirconia ball. Next, the thus mixed material powder was filled into a rubber mold, and four articles were then molded by a hydrostatic press under a pressure of 2.5 tons/cm².

Each molded article was chucked on an NC lathe, and then worked into a predetermined shape. Afterward, the article was sintered at 1,650° C. for 2 hours under atmospheric pressure in a nitrogen atmosphere. Two of these articles were further subjected to a heat treatment at 1,200° C. for 1 hour in the nitrogen atmosphere.

The axis portion, the edge portion and the caliber portion of each sintered body were ground/worked by the use of a diamond wheel to prepare four guide rollers for rolling in all, i.e., two guide rollers in which the heat treatment had been done after the sintering, and two guide rollers in which the heat treatment had not been done. According to the analysis of the rollers by an X-ray diffraction device, it was confirmed that a glass phase was present among the silicon nitride grains of the rollers in which the sintering was merely done at 1,650° C. for 2 hours, and a crystalline phase comprising 95% of a J phase and 5% of a K phase was present among the silicon nitride grains of the rollers in which the heat treatment was further done at 1,200° C.

These guide rollers and conventional WC super hard alloy guide rollers for comparison were each attached as a guide roller to an inlet of a finishing rolling mill, and 10,000 tons of an chromium-molybdenum steel bar was then rolled by each rolling mill. At the guide roller attachment position, the velocity and the temperature of the steel material were 30 m/sec and about 900° C., respectively. After the completion of the rolling, the appearance of the caliber portion of each roller was observed, and the profile of the same portion was measured by the use of a shape measuring instrument to inspect the abrasion wear of the roller. The results are shown in Table 1.

TABLE 1

| | No. | Roller Material | Heat-resistant Temperature[1] (°C.) |
|---|---|---|---|
| Example 1 | 1 | $Si_3N_4$ (subjected to heat treatment) | 1,230 |
| Example 1 | 2 | $Si_3N_4$ (subjected to heat treatment) | 1,200 |
| Comp. Ex. 1 | 3 | $Si_3N_4$ (not subjected to heat treatment) | 820 |
| Comp. Ex. 1 | 4 | $Si_3N_4$ (not subjected to heat treatment) | 780 |
| Comp. Ex. 1 | 5 | WC super hard alloy | — |
| Comp. Ex. 1 | 6 | WC super hard alloy | — |

| | No. | Surface State at Caliber Portion | Abrasion wear at Caliber Portion (mm) | Scratches on Steel Material |
|---|---|---|---|---|
| Example 1 | 1 | Mirror Surface, No chap | 0.09 | Absent |
| Example 1 | 2 | Mirror Surface, No chap | 0.08 | Absent |
| Comp. Ex. 1 | 3 | Mirror Surface, No chap | 0.75 | Absent |
| Comp. Ex. 1 | 4 | Mirror Surface, No chap | 0.63 | Absent |
| Comp. Ex. 1 | 5 | Chap and Baking were observed. | 0.09 | Present |
| Comp. Ex. 1 | 6 | Chap and Baking were observed. | 0.06 | Present |

[1]The heat-resistant temperature means a critical temperature at which strength at a high temperature has 90% or more of strength at room temperature.

As is apparent from the results in Table 1, with regard to the rollers of Nos. 3 and 4 in which any heat treatment was not carried out and a glass phase was present among the $Si_3N_4$ grains, the surface state of each caliber portion was good, and any scratch was not seen on the rolled steel material. However, the abrasion wear of the caliber portion was large, so that cutting correction was required to maintain dimensional accuracy in the rolling treatment. On the other hand, with regard to the WC super hard alloy rollers of Nos. 5 and 6, the abrasion wear was smaller as compared with that of Nos. 3 and 4, but chap and seizure occurred on the surface of each roller and scratches were also observed on the steel material. On the contrary, with regard to the rollers of Nos. 1 and 2 in which the heat treatment was carried out to accomplish the crystallization, the surface state of each roller was good, and the abrasion wear was substantially equal to that of the WC super hard alloy rollers.

EXAMPLE 2, COMPARATIVE EXAMPLE 2

A silicon nitride powder was mixed with each sintering aid so as to become a material composition shown in Table 2, followed by mixing, molding and sintering under the same conditions as in Example 1. Next, the sintered material was further subjected to a heat treatment at a heat treatment temperature shown in Table 2 to prepare guide rollers for rolling.

Each crystalline phase of the thus prepared guide rollers for rolling was analyzed by the use of an X-ray diffraction device. Furthermore, these guide rollers were each attached to an inlet of a finishing rolling mill, and a rolling test was made in the same manner as in Example 1 to measure the abrasion wear of a caliber portion of the roller. The measured results are shown in Table 2.

Here, "the J phase" means a crystalline phase having a caspidine structure of a monoclinic crystal system represented by $Ca_3(Si_2O_7)CaF_2$, and in the silicon nitride sinter of the present invention in which the phase among the grains is crystallized, a crystallographic position of Ca is occupied with Ca and rare earth elements such as Y, Mg, Fe and Ni, a crystallographic position of Si is occupied with Si and Al, and a crystallographic position of O is occupied with F, O and N. These crystalline phases can be identified by a powder X-ray diffraction method, and they have a diffraction line of the same pattern as $Si_3N_4 \cdot 4Y_2O_3 \cdot SiO_2$ shown in JCPDS card 32-1451.

Furthermore, a value calculated by the following equation is regarded as the quantity of the J phase in the sintered body for convenience sake. Thus, the quantity y (%) of the J phase can be obtained by the equation $$y = I_{J(131)} / [I\beta_{(101)} + I\beta_{(210)} + I\alpha_{(102)} + I\alpha_{(210)}] \times 100$$

wherein $I\beta_{(101)}$ and $I\beta_{(210)}$ are X-ray diffraction strengths from faces (101) and (210) of β-type silicon nitride, respectively; and $I\alpha_{(102)}$ and $I\alpha_{(210)}$ are X-ray diffraction strengths from faces (102) and (210) of α-type silicon nitride, respectively; and $I_{J(131)}$ is X-ray diffraction strength from a face (131) of the J phase.

The K phase is a crystal or its solid solution having a crystalline structure shown in JCPDS card 32-1462 and represented by the formula $YSiO_2N$. Furthermore, the H phase is a crystal or its solid solution having a crystalline structure shown in JCPDS card 30-1462 and represented by the formula $Y_5(SiO_4)_3N$. The quantity of the K phase or that of the H phase can be obtained by the above-mentioned equation in which $I_{J(131)}$ is replaced with $I_K(2\theta=19.5° C., CuK\alpha)$ for the K phase or replaced with $I_{H(112)} + I_{H(300)}$ for the H phase, respectively.

TABLE 2

| | | Composition of Material (%) | | | | | |
|---|---|---|---|---|---|---|---|
| | No. | $Y_2O_3$ | $Yb_2O_3$ | MgO | $ZrO_2$ | $Al_2O_3$ | $Si_3N_4$ etc |
| Example 2 | 7 | 9 | 15 | <1 | <1 | <1 | 89 |
| Example 2 | 8 | 1 | 3 | <1 | <1 | <1 | 96 |
| Example 2 | 9 | 5 | 20 | <1 | <1 | <1 | 74 |
| Example 2 | 10 | 6 | — | 4 | 3 | <1 | 86 |
| Example 2 | 11 | 6 | (CeO₂ 2) | 4 | 3 | <1 | 85 |
| Example 2 | 12 | 3 | 1 | 4 | 3 | <1 | 75 |
| Example 2 | 13 | 10 | 5 | 1 | 1 | <1 | 82 |
| Example 2 | 14 | 10 | — | 10 | 5 | <1 | 75 |
| Example 2 | 15 | 10 | — | <1 | <1 | 12 | 78 |
| Example 2 | 16 | 8 | — | <1 | <1 | 17 | 74 |
| Comp. Ex. 2 | 17 | 3 | 15 | <1 | <1 | <1 | 80 |
| Comp. Ex. 2 | 18 | 3 | 15 | <1 | <1 | <1 | 80 |
| Comp. Ex. 2 | 19 | 3 | — | 8 | 10 | <1 | 78 |
| Comp. Ex. 2 | 20 | 10 | — | 8 | 3 | 5 | 74 |
| Comp. Ex. 2 | 21 | 10 | — | <1 | <1 | 8 | 81 |

| | No. | Heat Treatment Temp. (°C.) | Crystalline Phase | | | Test Results Abrasion wear at Caliber Portion (mm) |
|---|---|---|---|---|---|---|
| | | | J Phase | H Phase | K Phase | |
| Example 2 | 7 | 1,250 | 97 | 2 | <1 | 0.07 |
| Example 2 | 8 | 1,230 | 96 | 3 | 1 | 0.06 |
| Example 2 | 9 | 1,300 | 95 | 8 | 2 | 0.09 |
| Example 2 | 10 | 1,200 | 90 | 6 | <1 | 0.08 |
| Example 2 | 11 | 1,250 | 94 | 4 | 1 | 0.08 |
| Example 2 | 12 | 1,200 | 96 | 3 | 1 | 0.06 |
| Example 2 | 13 | 1,210 | 98 | 2 | <1 | 0.08 |
| Example 2 | 14 | 1,200 | 92 | 5 | 3 | 0.08 |
| Example 2 | 15 | 1,100 | 87 | 9 | 4 | 0.15 |
| Example 2 | 16 | 1,150 | 88 | 7 | 5 | 0.14 |
| Comp. Ex. 2 | 17 | 1,350 | 83 | 5 | 12 | 0.37 |
| Comp. Ex. 2 | 18 | 1,050 | 80 | 15 | 5 | 0.38 |
| Comp. Ex. 2 | 19 | 1,250 | 88 | 8 | 4 | 0.26 |
| Comp. Ex. 2 | 20 | 1,250 | 78 | 12 | 10 | 0.45 |
| Comp. Ex. 2 | 21 | 1,200 | 83 | 10 | 7 | 0.28 |

As is apparent from the results in Table 2, when the heat treatment temperature is outside the requirements of the method according to the present invention, the crystalline phase of the sintered body constituting each of the obtained guide rollers for rolling comprises less than 80% of the J phase, more than 10% of the H phase and more than 5% of the K phase, which is outside the crystalline phase of the sintered body constituting the ceramic jig of the present invention. In consequence, the abrasion wear of the caliber portion of the obtained guide roller increases.

Furthermore, even if the heat treatment temperature is within the range of the method according to the present invention, the crystalline phase of the sintered body is liable to be outside the range of the present invention, when the composition of the sintered body (i.e., the composition of the sintering aid is not a preferred example of the present invention). As a consequence, the abrasion wear of the caliber portion of the obtained guide roller increases.

What is claimed is:

1. A ceramic jig for hot rolling which comprises a sintered body consisting essentially of $Si_3N_4$, a sintering aid and trace amounts of impurities, said body including a crystalline grain boundary phase among $Si_3N_4$ grains, said grain boundary phase comprising 80% or more of a J phase, 0.1 to 10% of an H phase, and 0.1 to 5% of a K phase.

2. The ceramic jig for hot rolling according to claim 1 wherein the grain boundary phase among the $Si_3N_4$ grains comprises 90% or more of the J phase, 0.1 to 5% of the H phase, and 0.1 to 1% of the K phase.

3. The ceramic jig for hot rolling according to claim 1 wherein the strength of the jig does not deteriorate at a high temperature of 1,200° C. or more.

4. The ceramic jig for hot rolling according to claim 1 wherein the composition of the sintered body constituting the ceramic jig for hot rolling consists essentially of 1 to 10 wt % of $Y_2O_3$, 3 to 20 wt % of $Yb_2O_3$, and a balance of $Si_3N_4$ and inevitable impurities.

5. The ceramic jig for hot rolling according to claim 1 wherein the composition of the sintered body constituting the ceramic jig for hot rolling consists essentially of 1 to 10 wt % of $Y_2O_3$, 1 to 10 wt % of MgO, 0.01 to 5 wt % of $ZrO_2$, and a balance of $Si_3N_4$ and inevitable impurities.

6. The ceramic jig for hot rolling according to claim 1 wherein the composition of the sintered body constituting the ceramic jig for hot rolling consists essentially of 1 to 10 wt % of $Y_2O_3$, 0.01 to 20 wt % of $Al_2O_3$, and a balance of $Si_3N_4$ and inevitable impurities.

* * * * *